United States Patent [19]

Woychik

[11] Patent Number: 5,169,666
[45] Date of Patent: Dec. 8, 1992

[54] PREPARATION OF SIMULATED HUMAN MILK PROTEIN BY LOW TEMPERATURE MICROFILTRATION

[75] Inventor: John H. Woychik, Lafayette Hill, Pa.

[73] Assignee: The United States of America as represented by the Secretary of Agriculture, Washington, D.C.

[21] Appl. No.: 791,691

[22] Filed: Nov. 14, 1991

[51] Int. Cl.$^5$ .................................. A23C 9/20
[52] U.S. Cl. ........................... 426/580; 426/801
[58] Field of Search ............... 210/651, 652; 426/580, 426/491, 484, 801

[56] References Cited

U.S. PATENT DOCUMENTS

| | | | |
|---|---|---|---|
| 4,140,806 | 2/1979 | Glimenius et al. | 210/651 |
| 4,397,927 | 8/1983 | Brog | 426/584 |
| 4,925,680 | 5/1990 | Schweikhardt et al. | 426/42 |
| 4,944,944 | 7/1990 | Tang et al. | 424/94.6 |
| 4,954,361 | 9/1990 | Girsh | 426/580 |
| 5,064,674 | 11/1991 | Girsh | 426/580 |

OTHER PUBLICATIONS

Woychik, J. et al., *Abstracts IFT Annual Meeting #81* (1990).

Primary Examiner—Jeanette Hunter
Assistant Examiner—Helen Pratt
Attorney, Agent, or Firm—M. Howard Silverstein; John D. Fado; Joseph A. Lipovsky

[57] ABSTRACT

The present invention is directed to the modification of bovine milk to simulate human milk protein composition which can be used in infant formulas. This is accomplished by low temperature ultrafiltration or microfiltration of bovine milk which has been pretreated at about 4° C. for 4 or more hours for micellar dissociation of $\beta$-casein, using either a 100,000 molecular weight (M.W.) cut-off or 0.1 $\mu$M to 0.2 $\mu$M membranes; permeates are obtained in which the $\Delta_s$-caseins are eliminated or substantially reduced; and preferably the $\beta$-lactoglobulin is reduced to levels of 4% or less through pH adjustment and sodium chloride addition.

21 Claims, 2 Drawing Sheets

PREPARATION OF SIMULATED HUMAN MILK PROTEIN BY LOW TEMPERATURE MICROFILTRATION

BACKGROUND OF THE INVENTION

1. Field Of The Invention

The present invention relates to a modified or "humanized" bovine milk product that approximates the composition of human milk protein, which can be used in infant formulas. The present invention also relates to a method for its production that can be readily adopted by the dairy industry in the manufacture of the product.

2. Description Of The Art

Milk is one of the most nutritionally complete foods, a fact reflected in it's widespread use as a dietary supplement in many parts of the world. This quality is of utmost importance during the neonatal period in mammals when it is the only or primary nutrient source. The nutrient content of milk show considerable variation among species with respect to the individual components and appears to be related to the rate of growth of the offspring.

Breast feeding is generally recognized as the preferred method of feeding human infants, however, when for a variety of reasons mother's milk is unavailable, infant formulas based on cow's milk are used. The use of modified or "humanized" bovine milk in infant formulas designed to simulate human milk as a substitute or supplement, has long been a subject of continuing research.

The composition of bovine milk and human breast milk differ significantly with respect to total protein concentration, the nature of individual proteins and acid coagulability. These compositional differences provide the basis for enhanced nutritive and digestive qualities attributed to human milk so important in infant nutrition. Bovine milk contains about 3.5 g protein/100 mL, whereas, human milk averages about 1.2 g/100 mL. While the protein level of bovine milk can be readily reduced to that of human milk, the casein, whey and nonprotein nitrogen (NPN) differ significantly. The relative contents of casein, whey and NPN are 78%, 17% and 5% respectively for bovine milk, versus 35%, 40% and 25%, respectively, for human milk. The casein/whey protein ratios of human milk and cow's milk are 0.4–0.7 and 3.0–4.7 respectively. Furthermore, the individual components comprising the casein and whey fractions of human milk and cow's milk are quite different. In human milk the casein fraction consists of only $\beta$-casein and the whey consists of $\alpha$-lactalbumin and other minor whey components; lactoferrin, immunoglobulins, serum albumin, and lysozyme but is devoid of any $\beta$-lactoglobulin. In bovine milk the major casein component is $\alpha_{s1}$-casein and contains $\beta$-lactoglobulin in the whey fraction. Modification of bovine milk or its fractions to simulate human milk protein composition must of necessity be concerned with the removal of $\beta$-lactoglobulin and with an enrichment of $\beta$-casein either by supplementation with $\beta$-casein or by the elimination of the $\alpha_s$-caseins.

A variety of methods including precipitation of selected bovine milk components and enzymic modifications have been utilized with varying degrees of success in efforts to "humanize" bovine milk. See Li-Chan E. et al. Can. Inst. Food Sci. Technol. J. 21:200 (1988). Methods such as dilution, heating, calcium reduction and homogenization of bovine milk have not been successful in simulating the clot of human milk formed under physiological conditions of the infant stomach, but a mild rennin treatment resulting in selective precipitation of part of the protein after heating has been successful in producing a modified bovine milk with coagulability characteristics similar to that of human milk.

Efforts directed to the elimination of $\beta$-lactoglobulin consist of gel filtration of whey (Forsum, E. J. Dairy Sci. 57:665 (1974); Mathur B. et al., J. Diary Sci. 62:99 (1979)), selective precipitation from ultrafiltered and demineralized whey (Amundson C. J. Food Proc. Preserv. 6:55 (1982)) and by precipitation with ferric chloride (Kuwata T. et al., J. Food Sci. 50:605 (1985)) or polyphosphate (Al-Mashikhi S. et al. J. Food Sci. 52:1237 (1987)). $\beta$-Casein enriched preparations have been obtained by rennin modification of bovine casein (Li-Chan, supra). Although these methods are capable of effecting selected changes in milk composition, they are generally batch procedures and are not especially conducive to plant operations when projected to a commercial scale.

It has been previously reported that microfiltration of 1 bovine skim milk using membranes with porosities of 0.1 or 0.2 micrometers ($\mu M$) at room temperature effected a fractionation of the whey and casein proteins and a micellar size separation (Woychik J. et al. Abstracts IFT Annual Meeting #81 (1990)). The permeates obtained had casein/whey ratios of 0.7–0.9 which are comparable to that of human milk. The casein component distribution of the permeates, however, was not significantly different from normal bovine casein.

U.S. Pat. No. 4,925,680 discloses a process for the production of liquid and powdered bifidogenic infant and dietetic foods in which mammals' milk, in particular cows' milk, is treated with neuraminidase to cleave the sialic acid in the milk. By splitting off sialic acid, the bifidogenic oligosaccharides of the residual protein will be accessible as growth factors for the bifidus bacteria which dominates the intestinal flora of breast-fed infants. The production of bifidogenic factors in cows' milk is suggested as a means of adapting cows' milk to more closely resemble human milk. U.S. Pat. No. 4,963,384 also discloses a method of producing bifidogenic factors in cows' milk but uses acid hydrolysis as the means for achieving the bifidogenic product.

U.S. Pat. No. 4,944,944 discloses a method for fortifying cow's milk with salt-activated lipase (BAL) to be used as an infant formula. The lipase, present in human milk but not cow's milk, is added to improve the absorption or digestion of ingested fats. The presence of BAL is human milk as stated in the patent, is a compensatory mechanism for the infant's immature pancreatic function.

U.S. Pat. No. 4,954,361 discloses a hypoallergenic milk which has the flavor and smell of natural whole mammalian milk. The hypoallergenic milk is preferably made from the ultrafiltrated permeate of cow's milk, which is substantially free of milk protein and fat. The permeate is then supplemented with, among other things, hypoallergenic protein and fat. The milk is intended for use by children and adults allergic to cow's milk.

German Specification 3,743,440 (Offenlegungschrift) discloses the separation of milk into soluble and insoluble components with microporous membranes using tangential flow. However the process does not disclose any pretreatment of the milk or the collection of the permeate for use in infant formulas.

The dairy industry currently utilizes ultrafiltration with membranes having 10,000 molecular weight cutoffs for the concentration of milk prior to cheese making and for the concentration of cheese whey. These operations do not yield a permeate product containing protein as the pores in the membrane used do not allow the passage of the protein.

SUMMARY OF THE INVENTION

It is an object of the present invention to overcome deficiencies in the prior art, such as indicated above.

The present invention is directed to the modification of bovine milk to simulate human milk protein composition which can be used in infant formulas. This is accomplished by low temperature ultrafiltration or microfiltration of bovine milk that has been pretreated at about 4° C. for 4 or more hours (preferably 16 to 20 hours) for micellar dissociation of $\beta$-casein, using either a 100,000 molecular weight (M.W.) cut-off or 0.1 micrometer ($\mu$M) to 0.2 $\mu$M membranes; permeates are obtained in which the $\alpha_s$-caseins are eliminated or substantially reduced; and preferably the $\beta$-lactoglobulin is reduced to levels of 4% or less of the total protein through pH adjustment and salt addition. Useable salts include sodium chloride, potassium chloride, ferric chloride, ammonium sulfate and polyphosphates; with sodium chloride being preferred.

It is an additional object of the present invention to provide a continuous, large-scale process which would provide the protein base from which a final "humanized" protein fraction can be isolated. In one embodiment the invention relates to a method using microfiltration to produce the 4:1 concentrations used in cheese operations while at the same time, permit the collection of a permeate fraction rich in $\beta$-casein and whey proteins which can be utilized as a protein base in "humanized" infant formulas.

It is a further object to effectively remove the $\beta$-lactoglobulin which is primarily responsible for milk protein allergy.

These and other objects and advantages of the instant invention will be more apparent from the following detailed description and exemplified embodiments, taken in conjunction with the accompanying drawings.

DESCRIPTION OF THE PREFERRED EMBODIMENTS

Figure 1:
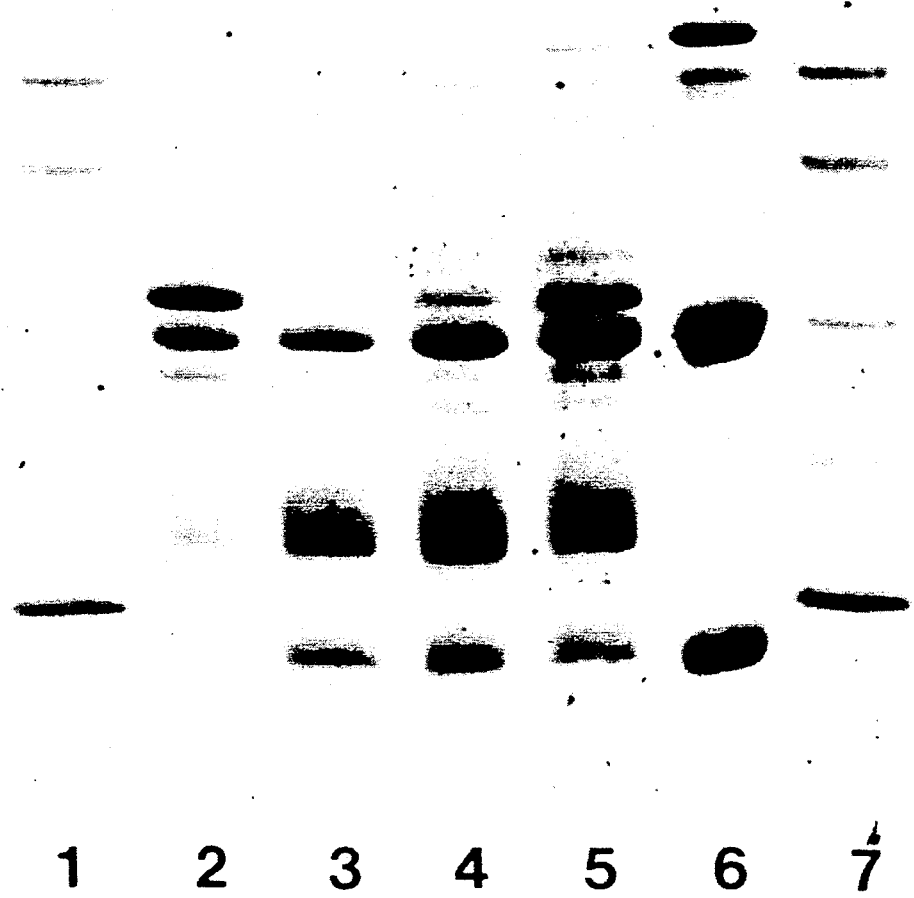
FIG. 1 is a comparative electrophoretic pattern of bovine and human milk proteins and bovine milk permeates. Lanes 1 and 7 represent low molecular weight (M.W.) standards; lane 2, bovine skim milk; lane 3, 100,000 (100K) bovine milk permeate; lane 4, 0.1 $\mu$M bovine milk permeate; lane 5, 0.2 $\mu$M bovine milk permeate; and lane 6, human milk protein.

The present invention has not previously been used in the dairy industry. The use of low temperature ultrafiltration in combination with pH and salt precipitation is a novel method of providing a new humanized bovine milk protein fraction or composition, is easily adapted to current operations and fully utilizes all of the original milk product. The process is not wasteful of milk or it's components nor results in the generation of substantial amounts of waste products.

The present invention utilizes microfiltration or ultrafiltration of bovine milk at low temperatures to obtain a permeate which after pH adjustment and salt precipitation approximates the composition of human milk protein. The retentate can be used in other dairy products. Any form of bovine milk can be used, with skim milk or reconstituted nonfat dry milk (10% solids) being preferred. The process of the invention involves cooling the milk to a low temperature of between about 2° C. to about 8° C., preferably about 4° C. to about 6° C., most preferably about 4° C. The milk is cooled until the $\beta$-casein dissociates from the casein micelles, this taking approximately 4 or more hours, preferably 16 or more hours. After this, microfiltration of the milk is then accomplished using membranes of 100,000 molecular weight cut-off or about 0.1 to about 0.2 $\mu$M pore size, preferably about 0.1 $\mu$M. The resulting permeate product is a modified or humanized bovine milk protein fraction or composition which approximates human breast milk protein composition and can be used as a protein base for infant formulas.

During microfiltration using membranes of about 0.1 to about 0.2 $\mu$M pore size, milk components of a size smaller than the stated porosities pass through the membrane into the permeate fraction. This includes the whey proteins, small micelles, and free $\beta$-casein which dissociated from the casein micelles at the low temperature. The milk fraction which does not pass through the membrane is referred to as the retentate. Since the only apparent casein component in human milk is $\beta$-casein-like, the resulting permeate product containing free $\beta$-casein, approximates human milk. Although some $\beta$-casein will dissociate from the casein micelles of bovine milk within a cooling period of 4 to 6 hours, for a preferred level of separation, the milk should be allowed to equilibrate for 16 or more hours. It has been determined that the $\beta$-casein content of the permeate is approximately 40% higher after 16 hours equilibration compared to that obtained from milk equilibrated only 4 hours The resulting permeate is readily concentrated by the use of a 10,000 MW cut-off membrane with the degree of concentration governed either by the desired lactose or protein content.

The $\beta$-lactoglobulin content can be reduced to levels of 4% or less by using the pH adjustment and sodium chloride addition precipitation method of Mailliart P. et al. *J. Food Sci.* 53:734 (1988).

The protein composition of the concentrated permeate fraction resulting from the microfiltration is approximately 30% to 55% casein and 45% to 70% whey, having a weight ratio between the two components of about 0.4 to about 1.2. The $\beta$-casein comprises approximately 60% of the casein fraction. These compositional characteristics of the resulting permeates and precipitates show a very high degree of similarity with human milk and indicate that this modified bovine milk fraction is an excellent protein base for infant formulas.

The invention can be readily utilized by dairy plants already familiar with membrane processing systems such as reverse osmosis or ultrafiltration which are used for concentrating whey and milk respectively. A variety of membrane devices; perpendicular or tangential flow, plate-frame, hollow fiber, and ceramic and other filtration devices of the stated porosities can be utilized. The process can be readily adapted to continuous-flow operations. Conventional membrane operations consistent with microfiltration are used with the present invention. Examples of equipment that can be used is manufactured by Millipore, Inc.

Various modes of operation, such as single-pass or recirculating retentate can be utilized depending on the membrane surface area. The permeate fraction can be further concentrated to the desired protein or lactose level using 10,000 MW cut-off membranes prior to pH-salt precipitation. The resulting product forms an ideal basis for "humanized" infant formulas.

Since only the permeate fraction is utilized in the infant formulas, the retentate fraction is removed and incorporated into cheese or other dairy products. The net result is no loss of valuable milk components. Further, as the separation is accomplished without the addition of hazardous reagents or toxic chemicals the resulting products are safe.

Altering the ratios of casein components has previously only been done using chemical or biochemical processes and has resulted in the formation of considerable waste product, disposal problems, and loss of income from discarded material. In contrast, the current process is a continuous, sanitary membrane process similar to that currently in use in the industry which offers the unique advantage in that the remainder of the milk (retentate) can be used in a number of other diary products in the plant. Thus the advantages are simplicity of operation, continuous-flow, sanitation, absence of byproduct disposal, and a process truly amenable to current dairy operations.

The following examples are offered merely to illustrate the present invention and are not intended as limitations on the invention.

EXAMPLE I

Microporous Ultrafiltration

Fresh pasteurized skim milk was equilibrated at 4° C. for 6 hours prior to microfiltration at 4° C. using a Minitan Acrylic Ultrafiltration System (Millipore). Membranes of 0.1 $\mu M$ pore size were used with flow rates of 800 ml/min.

Electrophoresis and Densitometry

Sodium dodecyl sulfate (SDS) electrophoretic patterns of cow's milk, permeate and human milk were obtained using the PHASTSYSTEM TM and 20% homogeneous polyacrylamide gels. The gels were stained with Coomassies Blue R and destained with 30% methanol-10% acetic acid. Densitometry of the electrophoretic patterns was done using a Biorad Model 620 Video Densitometer. The presence of $\beta$-lactoglobulin in the permeate was the principle difference when the permeates are compared to human milk. In the permeate, beta and gamma casein comprised 70% of the casein fraction. The casein component distribution was approximately 5% $\alpha-s_2$; 16% $\alpha_{s1}$ 62% $\beta$; 7% k; and 10% $\Gamma$, with a casein/whey protein ratio of 1.0.

Amino Acid Composition

Amino acid composition of the permeate fraction was determined on 24 hour hydrolysates using a Beckman Model 116CL analyzer. The amino acid compositions of bovine milk permeate and human milk are comparable as shown in Table I; data is in mol %.

TABLE I

Amino acid composition of human milk protein and bovine milk permeate protein.

| Amino Acid | Human Milk (mol %) | Bovine Milk Permeate (mol %) |
|---|---|---|
| Lys | 6.2 | 7.7 |
| His | 2.0 | 2.1 |
| Arg | 2.6 | 2.0 |
| Asp | 9.1 | 8.8 |
| Thr | 5.1 | 4.6 |
| Ser | 5.8 | 5.4 |
| Glu | 18.2 | 18.6 |
| Pro | 11.9 | 9.2 |
| Gly | 3.5 | 3.5 |
| Ala | 5.0 | 5.0 |
| Cys | 1.3 | 0.8 |
| Val | 6.8 | 6.6 |
| Met | 1.4 | 1.9 |
| Ileu | 5.2 | 5.6 |
| Leu | 9.7 | 11.9 |
| Tyr | 3.3 | 2.5 |
| Phe | 2.8 | 3.4 |

Other Compositional Analysis

Permeate fractions obtained following microfiltration of reconstituted nonfat dry milk at 4° C. had compositions similar to that in human milk. Table II shows the compositional analysis (weight %) of dried permeate, bovine, and human skim milk calculated from whole milk composition assuming a skimmed fat level equal to cow's skim milk. The moisture, protein, fat and ash were determined according to the methods described in Woychik J. et al., *J. Food Sci.* (1992) (in Press).

TABLE II

| | Protein | Fat | Ash | Lactose | Moisture |
|---|---|---|---|---|---|
| Skim milk | 35.0 | 0.9 | 8.5 | 51.6 | 6.7 |
| Permeate | 10.5 | 0.5 | 5.6 | 78.0 | 5.5 |
| Human milk | 10.3 | 1.1 | 2.3 | 80.0 | 5.7 |

The approximate composition of the permeate is 78% lactose,; 10 to 10.5% protein; 0.5% fat; 5.5 to 5.6% ash; and 5.4 to 6.0% moisture. The total composition of the permeate is very similar to human milk and is suitable for use in infant formulas.

EXAMPLE II

Both fresh pasteurized skim milk and reconstituted commercial low-heat nonfat dry milk (10% solids) were equilibrated at 4° C. for at least 16 hours prior to microfiltration. Fresh human milk was obtained locally and lyophilized.

Filtration was done in a 4° C. cold room using a Minintan Ultrafiltration System (Millipore) with 8 (480 cm$^2$) membrane plates (polyvinylidine difluoride) with porosities of 0.1 $\mu M$ at flow rates of 800 ml/min. Filtration was run in a recirculating retentate mode until the original milk volume (1-2 L) is concentrated 4:1. Permeates were concentrated using 10,000 MW cut-off membranes.

Flux rates of 0.5 to 0.8 (L/M$^2$/hr) were obtained while back-pressure during filtration remained constant until the initial milk volume was reduced by approximately 60%. At the final 4:1 concentration the back-pressure was approximately 60% higher than the starting pressure and was comparable for all three membranes. Attempts to use milk with 20% solids results in prohibitively high backpressure. Intermediate concentrations between 10 and 20% solids can be readily used.

The permeate fraction was freed of β-lactoglobulin using the pH-salt precipitation method of Mailliart P. et al. *J. Food Sci.* 53:743 (1988). The permeate was warmed to 25° C. and the pH adjusted to 3.0 using 1N HCl. Sodium chloride was added to 3% while stirring and the precipitate collected by filtration or centrifugation. The precipitate was resolubilized at pH 7.0, dialyzed to remove residual sodium chloride, and lyophilized. The supernatant which contained primarily β-lactoglobulin, was adjusted to pH 7.0, dialyzed, and lyophilized. Residual sodium chloride in the precipitate could also be removed by a water wash adjusted to pH 3.0.

Compositional Analysis

The moisture, protein, fat and ash of the final products were determined as described in Woychik J., supra. The products after lyophilization were 92-95% protein, 5-8% moisture, 0% fat and 0% ash.

The various fractions and controls were examined by sodium dodecyl sulfate (SDS) electrophoresis in the presence of 2-mercaptoethanol using the PHASTSYSTEM ™ (Pharmacia) with 20% homogeneous polyacrylamide gels. Densitometry of the electrophoretic patterns was done using a Biorad Model 620 Video Densitometer.

The SDS PAGE (20% homogeneous) electrophoretic patterns for the lyophilized permeates and control skim milk and human milk are shown in FIG. 1. The patterns for bovine and human milk (lanes 2 and 7) demonstrate the differences in composition and the approximate composition goal for the modified bovine milk fraction. β- and Γ-1 were the only casein components found in the 100,000 K permeate (lane 3) which was unexpected since $a_{s1}$- and k-casein were reported in the serum phase at a concentration of 10 and 7% of the serum casein, respectively. As seen in Table III, the casein content of this permeate is only 30.6%. With the increased porosity of the 0.1 μM membrane, the casein content increased to 45% due to the passage of micelles into the permeate. This is reflected by the presence of $a_s$- and k-caseins. Greater amounts of $a_s$- and k-casein are found in the 0.2 μM permeate.

TABLE III

Protein Component Distributions (%) in Bovine and Human Milks and in Microfiltered Bovine Milk Fractions.

|  | Human milk | Bovine milk | 100K permeate | 0.1 μM permeate | 0.2 μM permeate |
|---|---|---|---|---|---|
| Casein |  |  |  |  |  |
| $a_s 2$ | — | 8.7 | — | 3.9 | 4.5 |
| $a_s 1$ | — | 28.7 | — | 9.1 | 18.4 |
| β | 44.1 | 26.9 | 26.6 | 25.0 | 21.6 |
| k | — | 7.8 | — | 2.9 | 5.6 |
| Γ | — | 1.6 | 4.0 | 4.2 | 5.1 |
| Total | 44.1 | 73.7 | 30.6 | 45.1 | 55.2 |
| Whey |  |  |  |  |  |
| β-Lg | — | 13.6 | 40.6 | 32.2 | 21.6 |
| α-Lac | 28.3 | 5.8 | 23.0 | 15.3 | 10.1 |
| Minor | 27.6 | 6.9 | 5.8 | 7.4 | 13.1 |
| Total | 55.9 | 26.3 | 69.4 | 54.9 | 44.8 |

Since human milk contains only β-casein, α-lactalbumin, and minor whey proteins, the presence of greater than 20% $a_s$-casein in the 0.2 μM permeate would suggest that either the 100 K M.W. cut-off or 0.1 μM permeates would be best suited for further modification since both contain 25% or more β-casein and the latter, only 13% $a_s$-casein. $a_s$-Casein is thought to be related to curd hardness and limited digestibility. Since the 100K permeate contained 0.41% protein compared to 0.61% in the 0.1 μM permeate, the latter was used for removal of β-lactoglobulin.

Ferric chloride and polyphosphate have been used for the separation of β-lactoglobulin from whey protein. While effective, residual polyphosphate and ferric ion are undesirable in final products. The method selected for elimination of β-lactoglobulin from the permeates was that of Mailliart, supra, which uses salting out at low pH. Adjustment of the permeate pH to 3.0 and the addition of 3% sodium chloride effectively precipitated the caseins, α-lactalbumin, and minor whey proteins, but not β-lactoglobulin.

The precipitates obtained from either the 100K or 0.1 μM permeates by pH adjustment and sodium chloride addition can be either washed with water adjusted to pH 3.0 or resolubilized and diafiltered prior to drying can serve as an excellent protein base for infant formulas either by combination with dried permeates from whey protein concentration or as an ingredient in other infant formulations.

Figure 2:
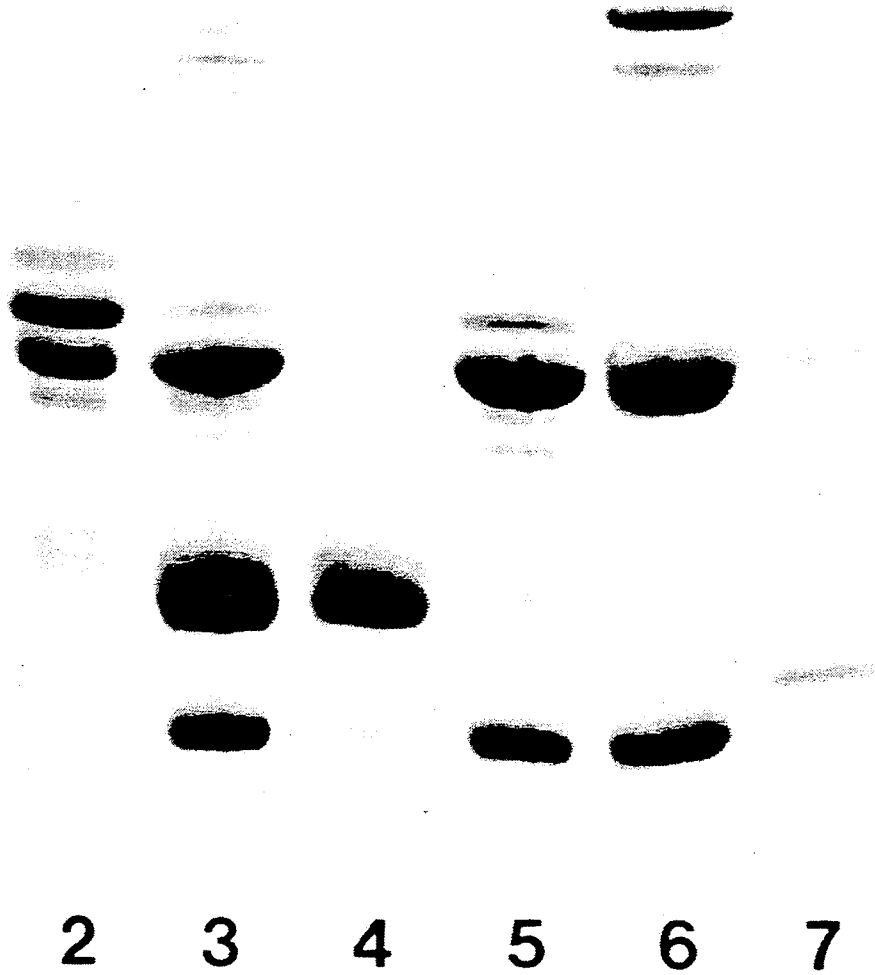
FIG. 2 is a comparative electrophoretic pattern of bovine and human milk protein and 0.1 $\mu$M permeate and precipitate. Lanes 1 and 7 represent low M.W. standards; lane 2, bovine skim milk; lane 3, 0.1 $\mu$M bovine milk permeate; lane 4, pH 3.0 sodium chloride supernatant obtained from bovine milk permeate; lane 5, pH 3.0 sodium chloride precipitate of bovine milk permeate; and lane 6, human milk protein.

The compositions of the resulting fractions are shown in the electrophoretic patterns in FIG. 2. The supernatant (lane 4) was essentially composed of β-lactoglobulin together with a small amount of α-lactalbumin. Only a small amount of β-lactoglobulin remained in the unwashed precipitate (lane 5). The relative component distribution in the precipitate determined by densitometry is presented in Table IV together with that of human and bovine milk and the original 0.1 μM permeate. The casein/whey ratio of 64/36 exceeded the 40/60 ratio in human milk, however, with the reduced $a_s$-casein and β-lactoglobulin content, the protein composition closely approximates that of human milk. Similar results were obtained with the 100 K permeate except no $a_s$-casein was present.

TABLE IV

Protein Component Distributions (%) in Bovine and Human Milks and in Microfiltered Bovine Milk Fractions.

|  | Human milk | Bovine milk | Permeate | Precipitate |
|---|---|---|---|---|
| Casein |  |  |  |  |
| $a_s 2$ | — | 8.7 | 3.9 | 2.9 |
| $a_s 1$ | — | 28.7 | 9.1 | 9.6 |
| β | 44.1 | 26.9 | 25.0 | 41.4 |
| k | — | 7.8 | 2.9 | * |
| Γ | — | 1.6 | 4.2 | 12.8 |
| TOTAL | 44.1 | 73.7 | 45.1 | 66.7 |
| Whey |  |  |  |  |
| β-Lg | — | 13.6 | 32.2 | 3.9 |
| α-Lac | 28.3 | 5.8 | 15.3 | 16.9 |
| Minor | 27.6 | 6.9 | 7.4 | 7.8 |
| Total | 55.9 | 26.3 | 54.9 | 28.6 |

* Not determined by densitometry

The virtual absence of $a_s$-casein and β-lactoglobulin in the "humanized" fraction does not guarantee that the amino acid composition will be comparable to human milk protein, however the amino acid composition of the 0.1 μM permeate shown in Table IV indicates an extremely close approximation of human milk amino acid composition. Essentially identical contents of lysine, histidine, and arginine and differences of 25% for most of the other amino acids reflect the reduced casein and β-lactoglobulin content.

Amino acid compositions were determined on 24 hour hydrolysates (6N HCl) of Example V was using a Beckman analyzer, Model 116CL. The amino acid compositions of permeate and human milk are shown in Table V in mol %.

TABLE V

Amino Acid Composition of Human Milk and "Humanized" Bovine Milk Fraction

| Amino Acid | Human | Humanized |
| --- | --- | --- |
| Lys | 6.1 | 6.1 |
| His | 3.0 | 2.8 |
| Arg | 1.8 | 2.0 |
| Asp | 6.9 | 8.6 |
| Thr | 4.5 | 5.3 |
| Ser | 7.3 | 5.8 |
| Glu | 18.9 | 17.2 |
| Pro | 12.4 | 9.9 |
| Gly | 3.8 | 4.7 |
| Ala | 3.5 | 5.7 |
| Cys | 0.6 | 0.3 |
| Val | 6.7 | 6.3 |
| Met | 1.9 | 1.4 |
| Ileu | 4.9 | 5.8 |
| Leu | 11.0 | 12.0 |
| Tyr | 2.6 | 3.2 |
| Phe | 3.9 | 2.8 |

Expressed as mole percent

The examples demonstrate the feasibility of using ultrafiltration with microporous membranes of either 100K M.W. cut-off or membranes of about 0.1 to 0.2 $\mu$M, preferably 0.1 $\mu$M, porosity to prepare permeate fractions from skim milk equilibrated at 4° C. having protein compositions similar to that of human milk. The casein/whey ratio of permeate (40:60) is comparable to that of human milk. The amino acid composition indicates that the permeate has the same protein nutritional value, Hambraeus, L. (1982), *Developments in Dairy Chemistry*, p. 289, Applied Science Publishers, New York.

The "humanization" of bovine milk has been a long sought after goal due to the considerable need for such a product in the manufacture of infant formula. The microfiltration approach offers two major advantages over the existing precipitation and enzymatic methods. The first is that the process does not use hazardous or toxic chemicals or other agents and the second is that the process does produces a retentate which can be readily incorporated into an existing dairy product line. An additional advantage of the present process (membrane filtration) is the ease with which the dairy industry can implement the process.

The foregoing description of the specific embodiments reveal the general nature of the invention and others can by applying current knowledge, readily modify and/or adapt such specific embodiments without departing from the inventive concept, and therefore such adaptations and modifications should be and are intended to be comprehended as being within the meaning and range of equivalents of the disclosed embodiments. It is to be understood that the phraseology or terminology employed herein is for purposes of description and not of limitation.

what is claimed is:

1. A humanized bovine milk product having a protein composition analogous to human milk protein wherein the composition of said protein is about 30% to about 55% casein and about 45% to about 70% whey wherein the casein fraction is comprised of at least 39% $\beta$-casein.

2. A humanized bovine milk product according to claim 1 wherein said composition is about 30% casein and about 70% whey.

3. A humanized bovine milk product according to claim 1 wherein the whey to casein ratio by weight is between about 0.4 to about 1.2.

4. A humanized bovine milk product according to claim 1 wherein the whey to casein ratio by weight is between about 0.4 to about 0.7.

5. A humanized bovine milk product according to claim 1 wherein the casein distribution is comprised of at least 86% $\beta$-casein.

6. A humanized bovine milk product according to claim 1 wherein the composition by weight after lyophilization is about 92% to about 95% protein and about 5% to about 8% moisture.

7. A humanized bovine milk product according to claim 1 wherein the amino acid composition approximates that of human milk.

8. A humanized bovine milk product according to claim 1 wherein the $\beta$-lactoglobulin component of the protein fraction is reduced to levels of about 4% or less.

9. A method comprising cooling a bovine milk product to a low temperature sufficient to dissociate $\beta$-casein to equilibrium and filtering through a microfilter to produce a humanized bovine mile product wherein the casein fraction thereof is comprised of at least 39% $\beta$casein.

10. A method according to claim 9 wherein said temperature is between about 2° C. to about 8° C.

11. A method according to claim 9 wherein said temperature is between about 4° C. to about 6° C.

12. A method according to claim 9 wherein said temperature is about 4° C.

13. A method according to claim 9 wherein said cooling and filtering continues until the $\beta$-casein dissociation reaches equilibrium.

14. A method according to claim 9 wherein said bovine milk is cooled for at least 4 hours and filtered at a low temperature sufficient to dissociate $\beta$-casein to equilibrium.

15. A method according to claim 9 wherein said bovine milk is cooled for at least 16 hours and filtered at a low temperature sufficient to dissociate $\beta$-casein to equilibrium.

16. A method according to claim 9 wherein said filtration step is done using a microfilter having a pore size of about 0.1 $\mu$M.

17. A method according to claim 9 wherein said filtration step is done using a microfilter having a pore size of about 0.2 $\mu$M.

18. A method according to claim 9 wherein said filtration step is done using a microfilter having a molecular weight cut-off of about 100,000.

19. A method according to claim 9 further comprising collecting the permeate.

20. A method according to claim 9 further comprising collecting the retentate.

21. A method according to claim 9 wherein said bovine milk product is skim milk or reconstituted nonfat dry milk.

* * * * *